United States Patent [19]

Memmola

[11] Patent Number: 4,884,055

[45] Date of Patent: Nov. 28, 1989

[54] ANTITHEFT SYSTEM

[75] Inventor: Serafino Memmola, Varese, Italy

[73] Assignee: Delta Elettronica S.p.A., Varese, Italy

[21] Appl. No.: 124,885

[22] Filed: Nov. 24, 1987

[30] Foreign Application Priority Data

Dec. 3, 1986 [IT] Italy .................. 83667 A/86

[51] Int. Cl.$^4$ ............................. B60R 25/00
[52] U.S. Cl. .................... 340/426; 180/287
[58] Field of Search .......... 340/63, 64, 825.69; 367/93; 180/287; 307/10 AT

[56] References Cited

U.S. PATENT DOCUMENTS

| | | | |
|---|---|---|---|
| 3,735,346 | 5/1973 | Fox | 340/63 |
| 3,858,175 | 12/1974 | Kopera, Jr. | 340/63 |
| 4,143,368 | 3/1979 | Route et al. | 340/63 X |
| 4,159,466 | 6/1979 | Mengel | 340/63 |
| 4,383,242 | 5/1983 | Sassover et al. | 340/64 |
| 4,691,801 | 9/1987 | Mann et al. | 180/287 |
| 4,754,255 | 6/1988 | Sanders et al. | 340/64 |

FOREIGN PATENT DOCUMENTS

| | | | |
|---|---|---|---|
| 2614640 | 10/1977 | Fed. Rep. of Germany | 340/63 |
| 3003887 | 8/1981 | Fed. Rep. of Germany | 340/63 |
| 2170633 | 8/1986 | United Kingdom | 340/63 |

OTHER PUBLICATIONS

Rev. Esp. Electronica (Spain), vol. 29, No. 328 (Mar. 1982).

Primary Examiner—Joseph A. Orsino
Assistant Examiner—Brian R Tumm
Attorney, Agent, or Firm—Peter K. Kontler

[57] ABSTRACT

An antitheft vehicle protection system has a remote control unit with which separate messages can be sent to a vehicle mounted protection device. The protection device, a portion of which is placed in a favorable location inside the vehicle such as near a windshield, monitors a variety of vehicle conditions such as the status of door locks, the status of an engine operation control circuit, the insertion of an ignition key and the integrity of the power circuit leading to the antitheft system. One of the messages is decoded as representative of a robbery in progress when certain other alarm conditions such as an open driver's door and a running engine exist. The other message is decoded as representative of a panic condition. Both messages can result in audible alarms. In case of the alarm indicative of a robbery in progress, a delay is interposed to enable a sufficient distance between driver and robber to be achieved before an alarm condition such as an engine lock out is established. A sabotage detection scheme is employed to sense unauthorized tampering with the power supply circuits. An ultrasonic sensor is used to detect unauthorized vehicle entry.

21 Claims, 6 Drawing Sheets

ANTITHEFT SYSTEM

FIELD OF THE INVENTION

The present invention relates to an antitheft system, particularly an antitheft system for motor vehicles.

PRIOR ART

Various types of antitheft systems for motor vehicles now exist. Among them, the more complex are the remote-controlled systems with portable remote control. See, for example, my U.S. patent application for a Remote Control Apparatus For A Property Protection Device, Ser. No. 895,481 filed August 11, 1986 now U.S. Pat. No. 4,733,215 and which is a continuation in part of Ser. No. 817,884 filed January 1, 1986 (now abandoned). The functions of the system are to cause an alarm, generally an acoustical alarm and a warning light, when theft attempts are made, either by removal of the motor vehicle by lifting it, or by forcing the accesses open or when the vehicle is sabotaged. In some such systems, the electric input from the vehicle battery is excluded as the main power for the antitheft system and independent batteries are provided for its operation.

SUMMARY OF THE INVENTION

An object of the device according to the present invention is to provide a new car antitheft system which, in addition to the advantages achieved up to now, provides advantages that increase protection of the motor vehicle as well as its driver.

For brevity and convenience, the identification in the text and claims of circuits, modules and other main components used in the antitheft system use initials instead of their complete names.

One motor vehicle antitheft system ATS (AntiTheft System) according to the present invention includes a portable remote control. This has an encoding module with a control key, a transmitter module using radio or other types of transmission modes and a battery.

On the motor vehicle, a device is installed comprising a receiving module compatible with the transmitter module, a decoder module, an ATSO (AntiTheft System Operation) module, and an alarm input module coupled to detectors, such as contact sensors, ultrasound modules, lift sensing devices and other types of detectors.

The ATS system can be armed by actuation of the remote control key under certain conditions such as when an electrical power circuit EOCI (Engine Operation CIrcuit), essential for the operation of the engine, is disconnected. The system can also be disarmed by the remote control key. An alarm is actuated in case the ATS system itself is sabotaged.

An antirobbing alarm feature is provided by which the remote control unit can be used to thwart a robbery. This feature is enabled under certain conditions such as when the engine operation circuit is enabled, the key is in the ignition and the driver door is open. This set of conditions recognizes when a robber compels the driver out from the motor vehicle with the engine running or the ignition key inserted and the engine operating circuit EOCI on. If the driver actuates the remote control key, such as a reserve one which he normally keeps in his pocket, while or immediately after he gets out from the vehicle and while the door is still open, the antirobbing alarm is set off. This may be acoustic and/or another type of alarm and may cause a disconnection of the EOCI, resulting in a locking of the engine itself.

In one preferred embodiment, the ATSO module includes circuits and components connected so that the antirobbing alarm occurs after a predetermined time delay following actuation of the remote control by the driver. During this delay, the robber is likely to have gone away from the driver with the vehicle before an alarm occurs. The robber is, therefore, sufficiently removed to prevent reaction against the driver.

Another feature of the invention involves the use of memory circuits to initiate an antirobbing alarm within a predetermined time even after the driver's door is closed.

As described herein for a preferred embodiment, the ATSO operating module comprises a microprocessor (MP) and at least the following electronic circuits:

a SAbotage CIrcuit (SACI) for sabotage detection and warning;

a REset CIrcuit (RECI) to reset the microprocessor MP;

a Pilot Door CIrcuit (PDCI) for unlocking of the MP when the engine operating circuit is connected or enabled, but the driver's door is open;

a Detector Supply CIrcuit (DSCI) for arming and disarming of the ATS and for enabling of the alarm detectors;

an AntiRobbery CIrcuit (ARCI) for signaling to the MP that an event has occurred, including that the EOCI is connected and the driver's door is open;

a Lock Checking CIrcuit (LCCI) to check a locking-/unlocking state of a Door Locking DEvice (DLDE) used to lock the doors;

an Acoustic Device CIrcuit (ADCI) for activating an acoustic and/or other type of alarm device;

a Door Unlocking CIrcuit (DUCI) for unlocking the DLDE and, therefore, the door locks;

an Alarm Lights CIrcuit (ALCI) for actuating the alarm warning lights; and a SUpplying CIrcuit (SUCI) to supply power to modules of the ATS installed on the motor vehicle and to other elements of the motor vehicle connected to the ATS.

The microprocessor MP is provided with a ROM masked upon manufacture with a program that directs the ATS to effect the following program routines:

The MP, after having been installed on the motor vehicle actuates its clock oscillator. A reset signal that is applied to its reset pin unblocks the MP. The MP then determines through its circuit SACI whether sabotage is occurring. If no sabotage is in process, the MP then looks for a control input from the decoding module. As soon as a control pulse arrives as a consequence of a control given by the remote control, the MP checks the detector supply circuit DSCI to determine whether the ATS is armed or not.

If the ATS is not armed, the MP interprets the input control pulse from the remote control as a command for arming the ATS after the MP has first determined that the driver's door is not open and that the engine operating control circuit EOCI is not enabled.

The MP then arms the ATS by enabling the detector supply circuit DSCI and actuates through the ALCI the special indicating lights, usually the direction indicators, for signaling to the driver that the ATS has been armed.

The MP determines through the lock checking circuit LCCI whether the door locking device DLDE has unlocked the door locks. If so, then the MP actuates the door locking circuit DLCI to cause the DLDE to lock the locks. After some seconds delay, the MP confirms the locking of doors by monitoring the lock checking circuit LCCI. If the doors have not been locked, the MP actuates one of the alarm detectors to inform the driver that the doors are unlocked. These last three operations are not carried out if the first check of the door locking device indicates that the doors are locked.

If the ATS is already armed, then the MP interprets the input signal coming from the remote control as a command for disarming the ATS. Hence, the MP disarms the ATS through the detector supply circuit DSCI; actuates indicators, usually the direction indicator lights, through the alarm circuit ALCI to inform the driver that the ATS has been disarmed; checks the state of the door locking device DLDE; and actuates the door unlocking circuit DUCI to unlock the DLDE if necessary.

After the ATS is armed and an alarm event occurs, the MP activates the acoustic device circuit ADCI to initiate an alarm cycle. This involves enabling of an Engine Locking CIrcuit ELCI to disable the engine operating circuit EOCI and thus lock the engine. An alarm warning light is then activated.

If the ATS is not armed, but the engine operating circuit EOCI is connected and the door on the driver's side is open, a control signal arriving at the MP remote control key is interpreted by the MP as a command to implement the antirobbing alarm routine. Therefore, the MP responds by immediately arming the ATS through the detector supply circuit DSCI. After a predetermined time delay, the MP actuates an alarm generator, acoustical or other type, and the engine locking circuit ELCI to effectively disconnect the engine operating circuit EOCI. The engine is then locked. The antirobbing alarm routine can be disabled or reset only by the opening and subsequent closing of the power supply circuit SUCI. The routine cannot be stopped merely by a command issued from the remote control.

In another preferred embodiment, the MP is programmed so that the sabotage alarm of the ATS is caused not by the disconnection of power to the ATS, but rather by the reconnection of the power after it has been disconnected. Such alarm can only be stopped after reopening and closing of the ATS supply switch.

Another feature of the invention enables the MP to be programmed to establish the character of alarms such as the duration of an alarm cycle and whether an alarm should be continuous or intermittent.

In another aspect of the invention, the alarm input module that is coupled to sensing devices can, with electronic circuits and the program of the MP, select the signals from detectors and then send distinct alarm signals to the ATSO. In this manner, different alarms can be given according to selected sensors.

As further described herein for one form of the invention, the ATS includes an ultrasonic module US as an alarm detector and which is provided with one or more light emitting diodes LEDs. These LEDs are connected to the US module itself, to the input module, and to the MP in the ATSO. The MP is programmed so that one of the LEDs gives a light indication that the ATS has been armed. The same or another LED can give an indication by going on or off that an alarm is in progress. Furthermore, after each alarm, one LED gives an indication by intermittent or pulsed lighting that an alarm has occurred. Based upon the character of the light pulses, the LED can indicate which detector has given an alarm signal.

In case an LED indicates that the ATS is armed, an intermittent signal is sent only after the ignition key is inserted and the ATS is disarmed.

In another feature of the invention, the ultrasound module is mounted in a housing installed in the upper part of the windshield inside the motor vehicle. The receiving module of the ATS is mounted in the same housing so as to improve the reception of the signals sent by the remote control, which therefore may be provided with a smaller power source.

In yet another feature of the invention, one of the LEDs is so connected that it can signal that an alarm is in progress even during the time of inhibition of the ATS after having been armed. This arrangement allows testing of the US module without activating the alarms.

In yet another feature of the invention, the alarm input module and the ultrasound module comprise electronic circuits that send alarm signals to the module ATSO when the module US is sabotaged. Sabotage conditions are sensed such as when electrical power to the module is cut or short-circuited, or when the driver's door is opened or when an emitting and/or receiving surface of the ultrasound module is masked or blinded.

In another form of the invention, the module ATSO comprises electronic circuits that can be inhibited and the MP is so programmed that the antirobbing routine is suppressed.

In another feature of the invention, the remote control unit has a second control key. When this second key is actuated, the encoding module sends a second partially different message from the message sent as a result of an actuation of the first key. The decoding module in the receiver decodes the two messages and sends pulses to the ATSO module to control different circuits or different pins of the MP. The ATSO module includes electronic circuits and the program of the MP is such that the ATSO module responds to a pulse representative of the second message to generate a panic alarm. This panic alarm occurs independently from the arming or disarming of the ATS.

It is, therefore, an object of the invention to provide a vehicle protection system with sabotage and robbery protection.

This and other objects and advantages of the invention can be understood from the following detailed description of a preferred embodiment as shown in the drawings.

BRIEF DESCRIPTION OF DRAWINGS

In order to explain the present invention, a preferred embodiment shall be described, as an example only, with reference to the enclosed drawings wherein.

DETAILED DESCRIPTION OF DRAWINGS

Figure 1:
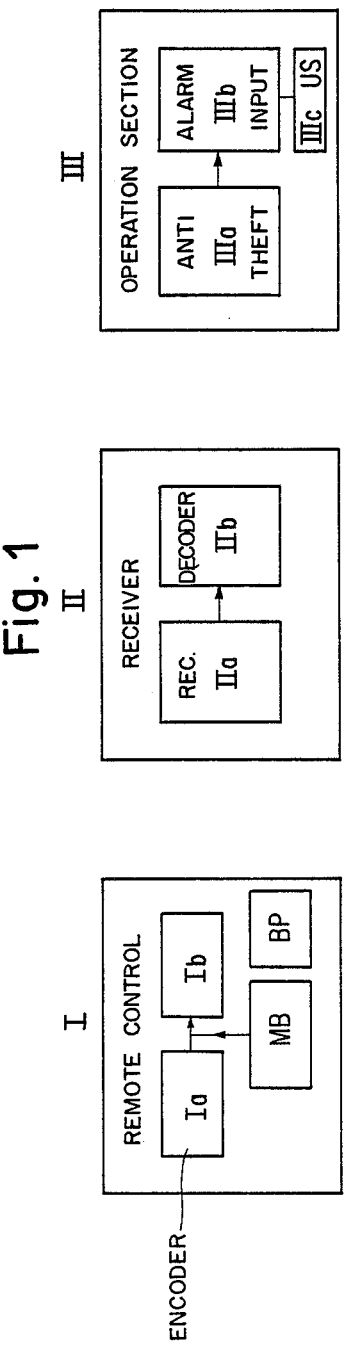
FIG. 1 is a block diagram of a protection system in accordance with the invention.
Figure 1A:
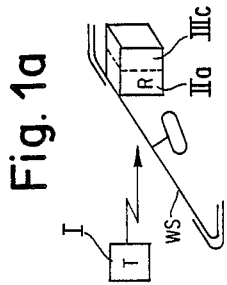
FIG. 1A is a partial sketch of a vehicle front windshield portion near which a protection device in accordance with the invention is placed.

The antitheft system for motor vehicles ATS (FIG. 1) comprises a portable remote control unit I, as well as a receiving unit II and an operation section III both of which are installed on the motor vehicle. As shown in FIG. 1A, the receiving section II is preferably placed near the top of the front windshield and inside the vehicle.

The remote control I comprises an encoding module Ia, a radiotransmission module Ib, a microbattery MB and an acoustical controller BP. The receiving section II comprises a radioreceiving module IIa and a decoding module IIb, while the operation section III comprises an operation module ATSO of the antitheft system IIIa, a warning input module IIIb and an ultrasound module IIIc US.

Encoding module Ia (FIG. 2) of the remote control comprises the integrated circuit IC1, composed of a COP 411 (Controlled Oriented Processor) Single Chip Microcontroller of National Semiconductor with 20 pins controlled by the switches SW1 and SW2 respectively actuated by keys TA1 and TA2.

IC1 is supplied via its pin 2 with a positive voltage, 3 V, by the microbattery MB while pin 10 is grounded by closing either of the two switches SW1 and SW2. The pins 6, 5, 4, 3, 1, 20, 19, 18, 13 and 12 are encoding pins and can be connected in any of three positions. They can be coupled to remain open, or be connected to the conductor S1 which is grounded by switches SW1, SW2, or be connected to the conductor S2 connected to pin 8. Pin 8 is brought high by IC1 when it starts operating with the closure of one of the switches SW1, SW2.

The encoding pins are so prepared before installation of the remote control as to constitute a personalized encoding for that specific remote control. Pin 16 is connected through the resistor R1 (47k) to the positive terminal of battery MB and through a capacitor C1 (100 pF) to ground, to complete the clock oscillator circuit of IC1. Pin 7 is also directly connected to the positive terminal and through the electrolytic capacitor C2 (0.1 mF) to ground G.

For convenience, we shall use the letter "m" to indicate "micro" and "p" to indicate "pico" for capacitor values. The values for the resistors are in ohms. The letter "k" represents a thousand.

The reset pin 17 is connected to the positive voltage V through the parallel combination of the resistors R1 and R2 (47k) and the diode D1 (1N4148) and to ground through the capacitors C1 and C3 (100 kpF).

The ground G for the entire remote control section I is only connected when one of the two control keys TA1 and TA2 is actuated to close the switch SW1 or SW2. This economizes use of the battery MB. Pin 11 is connectable to ground only by the closure of SW2. The output signal from IC1 is on pin 9.

Operation of the Remote Encoding Module Ia

When key TA1 is depressed and SW1 is closed, pin 10 of IC1 is grounded. Pins 8 and 17 go low and capacitor C3 begins to charge. When C3 is charged, pin 17 becomes high, therefore enabling IC1. A cyclical reading of the encoding pins begins for formation of an encoded message M1, composed of 10 bits, the encoding of which corresponds to the connections of the aforesaid pins 6, 5, 4, 3, 1, 20, 19, 18, 13, 12. Encoded message M1 is preceded by some initial pattern bits and followed by some closing bits. The encoded message M1 is on pin 9.

In the event IC1 is activated by the closure of switch SW2 instead of SW1, then the same operation arises as caused by the closure of SW1 but with the difference that the encoded message M2 has an initial pattern of bits that is different from that generated by the closure of SW1.

Figure 2:
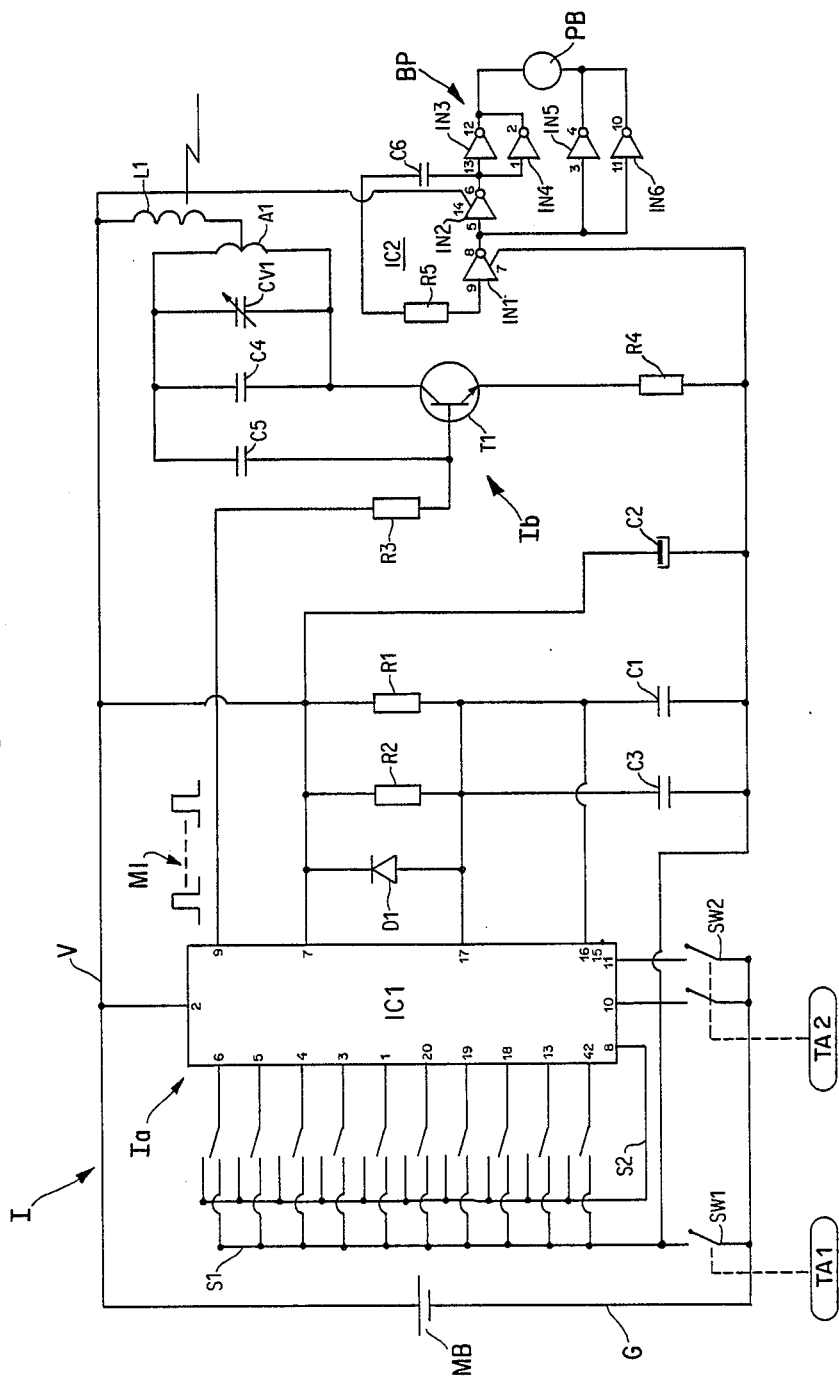

Radiotransmission Module Ib (FIG. 2)

The radiotransmission module Ib comprises a transistor amplifier T1, the base of which is connected through resistor R3 (390k) to pin 9. The emitter of T1 is connected to ground through resistor R4 (1k) while the collector of T1 is connected to capacitor C4 (2.2 pF), the variable capacitor CV1 (1.4 to 4 pF) and the coil A1 (composed of a winding 1 mm and 10 mm inside diameter). Coil A1 acts as an oscillating circuit with capacitor CV1 and also as an antenna. Coil A1 is connected to the positive voltage V through inductance L1 (8.2 mH). In addition, the collector of T1 is connected through the parallel combination of C4, CV1 and A1 and capacitor C5 (3.3 pF) to the base of T1.

The MB battery can be one as manufactured by Toshiba, composed of a 3 V lithium element. Remote unit I further includes acoustic alarm warning circuitry BP. BP emits an acoustic, continuously audible alarm when one of the two keys TA1 or TA2 is depressed. The circuitry for the alarm BP includes the integrated circuit IC2, which is an inverter Schmitt Trigger such as made by the National Semiconductor Company (Model No. 74C14NHEX) having components connected as shown in FIG. 2 with the resistor R5 (470k) and the capacitor C6 (330 pF). The acoustical warning transducer PB can be a piezoelectric disk (Murata 7NB/15/9DM/5 15 mm).

Figure 6:
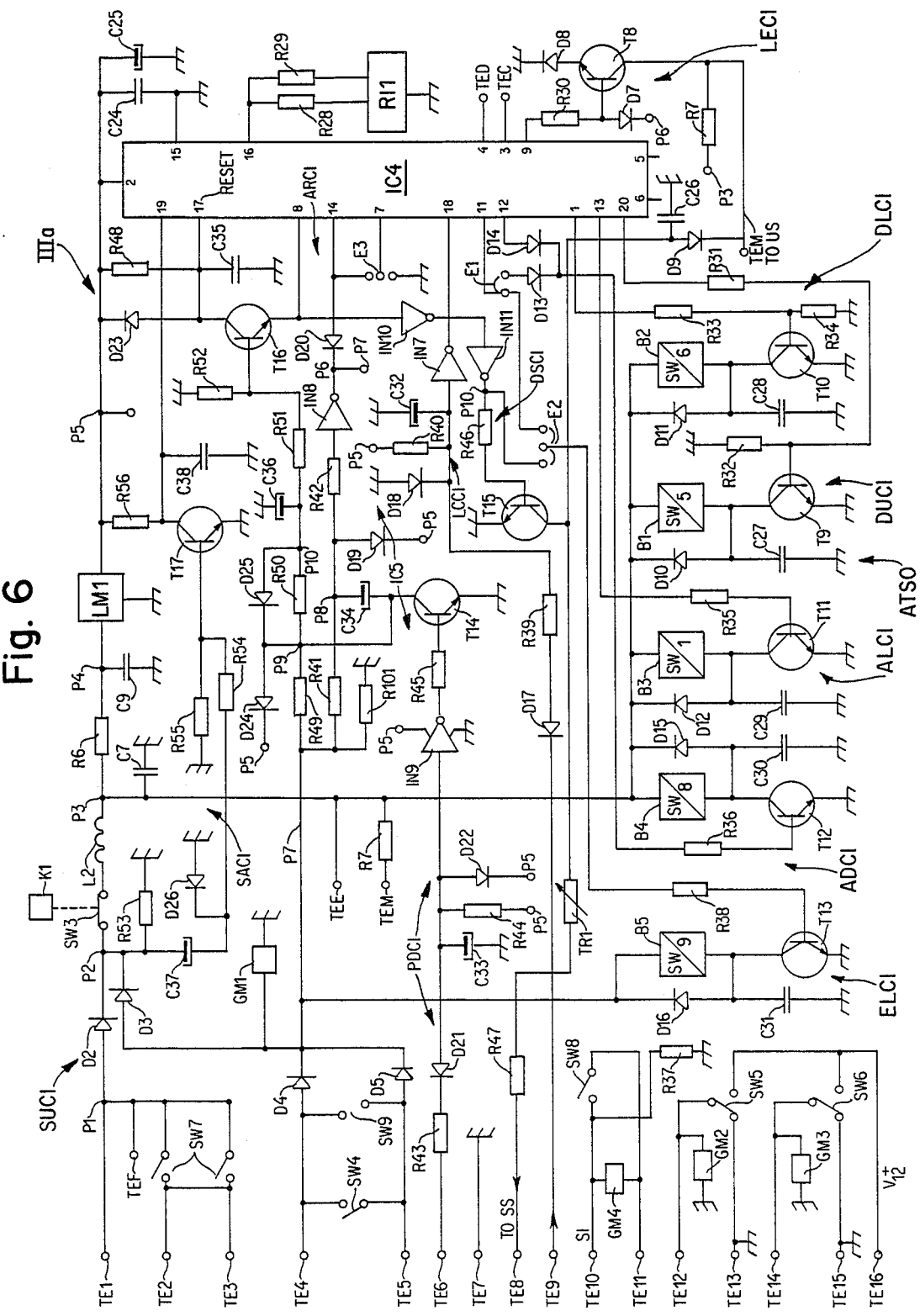
Figure 8:
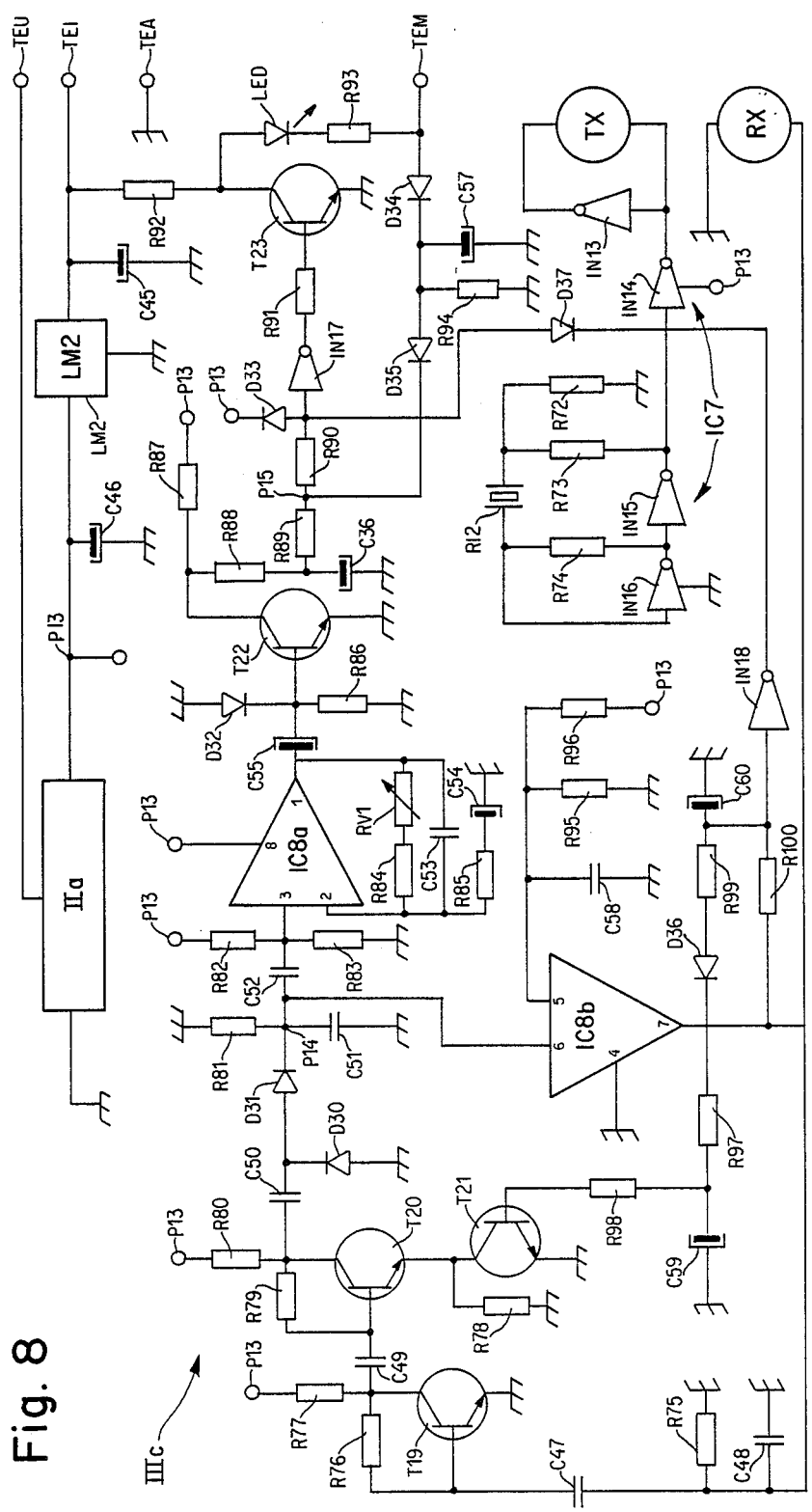

Power Supply Circuits of Sections II and III (FIGS. 6 and 8)

The electrical power supply for the decoding module IIb, the operation module of the antitheft system IIIa, and the warning input module IIIb is provided by the circuit SUCI (see FIG. 6 top left) which has its terminal TE1 connected to the positive pole +12 V of the vehicle battery. The SUCI circuit comprises a diode D2 (1N4004), a switch SW3 controlled by the key K1 to supply power to the ATS, an inductance L2 (10 mH), a resistor R6 (100k) and capacitors C7 (220 kpF) and C9 (100 kpF) and is connected to ground by a voltage regulator LM1 (composed of a stabilizer circuit such as LM2931 of National Semiconductor). Key K1, which controls SW3, simultaneously but inversely controls an emergency switch SW4; that is, when K1 closes SW3, SW4 is opened, and vice versa.

The circuit SUCI has the following branches:

The supplying line at +12 volts of the direction indicators and that of the warning input module are connected at the point P1 upstream of SW3 and of diode D2.

From the point P2 downstream of D2 and upstream of SW3, power is supplied to a reset circuit RECI.

Point P2 is also connected through diodes (1N4004) D3, D4, D5 to a supply voltage at terminals TE4 and TE5 and a voltage limiter GM1 (GE-MOV of the General Electric Company). The terminal TE4 is connected to the vehicle battery through a vehicle dashboard switch (which is not indicated in the figure) and which is controlled with the engine ignition key. Terminal TE4 is further coupled through switches SW4 and SW9 to the terminal TE5 from which an electric circuit EOCI that is essential for operation of the engine (not indicated in the figure) branches out. SW4 is normally open. After installation of the ATS, the removal of key K1 causes closure of SW3 and an opening of SW4 and therefore connection of the supply voltage to the ATS. SW9 is controlled by a circuit ELCI.

A line from junction P3 that is downstream of L2 provides the +12 volt potential line to coils B1, B2, B3, B4 of a module ATSO, to a terminal TEE which provides power to input module IIIb and, through a resistor R7 (4.7k), to a terminal TEM which provides electrical power to a module US.

Junction P4 is connected to ground through a capacitor C9.

A junction P5 carries a low voltage (5 V) which is connected to power supply lines in the decoder module IIb, the operation module IIIa and the input module IIIb.

Power to the radioreception module IIa and module US is through electrical connection of power to input module IIIb and module US. In this embodiment, the receiving section II, in order to improve the reception to the utmost, is installed in the same housing as the module US, which is itself located inside the motor vehicle on the front windshield near the rearview mirror.

Figure 3:
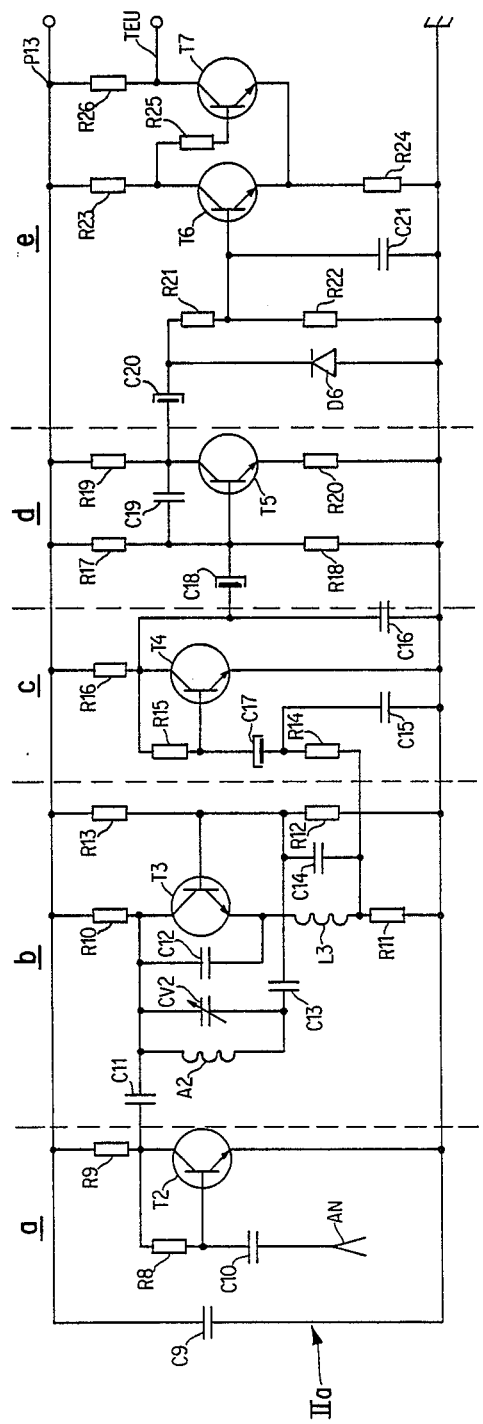
FIGS. 2, 3, 6, 7 and 8 are circuit diagrams used in the protection system.

Radioreception Module IIa (FIG. 3)

The radioreceiver IIa in receiver section II is composed of a high frequency amplifier "a", a superreactive receiver "b", and two stages "c" and "d" for low frequency amplification to a pulse former "e".

The amplifier "a" is composed of the transistor T2 (BFR91) with the resistors R8 (47k) and R9 (560), the capacitors C9 (1 kpF) and C10 (6.8 pF), and the antenna AN. The superreactive receiver "b" comprises the capacitors C11 (0.68 pF), C12 (3.3 pF), and C14 (270 pF), the variable capacitor CV2 (from 2.5 to 6 pF), the coil A2 (with 2.5 copper windings 1 mm and inside diameter of 4.6 mm and 1 mm distance between the windings), the inductance L3 (10 mH), the resistors R10 (10k), R11 (10k), R12 and R13 (82k), and the transistor T3 (BRE91). The first stage "c" of the low frequency amplifier comprises the transistor T4 (BC239C) with the resistors R14 (47k), R15 (4.7M), and R16 (10k), the capacitors C15 and C16 (both 1 kpF), and the electrolytic capacitor C17 (2.2 mF).

The second stage "d" of the low frequency amplifier comprises the transistor T5 (BC239C) with the resistors R17 (560k), R18 (82k), R19 (8.2k), and R20 (100k), the electrolytic capacitor C18 (2.2 mF) and the capacitor C19 (330 pF). The pulse former "e" is composed of the electrolytic capacitor C20 (2.2 mF), the diode D6 (AA117), the Schmitt trigger comprising the resistors R21 and R22 (82k), the transistors T6 and T7 (both BC182B), the resistors R23 (33k), R24 (220k), R25 and R26 (10k) and the capacitor C21 (1 kpF). The output terminal TEU of the receiver, i.e., the collector of T7, is connected to pin 7 of the integrated circuit IC3 of the decoding module IIb shown in FIG. 4.

Figure 4:
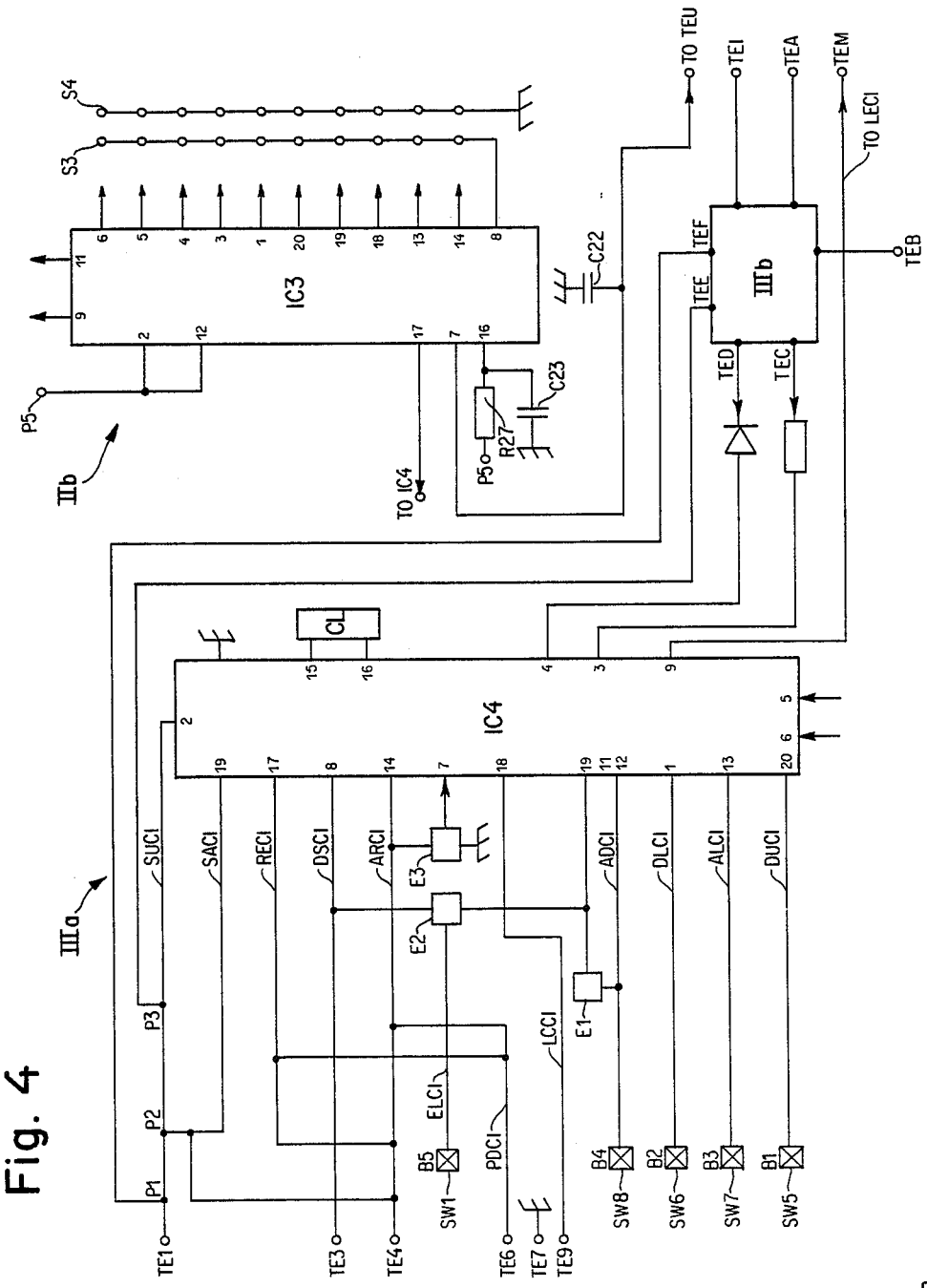
FIGS. 4 and 5 are simplified block diagrams of the protection system.

Decoding Module IIb (FIG. 4)

The decoding module IIb comprises the integrated circuit IC3 composed of the COP 313L (Control Oriented Processor) of National Semiconductor with 20 pins, of which the pins 2 and 12 are connected to the point P5 (at +5 V) of the voltage supply circuit. Pin 16 of the oscillator system (clock) is connected to the +5 volt point P5 through a resistor R27 (47k) and to ground through the capacitor C23 (100 pF). The reset pin 17 is connected to the reset pin 17 of the integrated circuit IC4 of the module IIIa.

The input pin 7 of IC3 is connected to the output TEU of radio receiver IIa (see FIG. 3) and is connected to a filter C22 (3.3 kpF). The decoding pins 6, 5, 4, 3, 1, 20, 19, 18, 13, 14 can be prepared before installation similarly to the encoding pins of IC1, that is they can be connected by conductor S4 to ground, or connected through conductor S3 to pin 8, or remain connected to a floating open line.

Pins 9 and 11 of IC3 are the output pins which transmit a positive impulse of 1.5 second duration to module ATSO IIIa in section III when IC3 receives a message on pin 7 with one of the two pre-established codes. In case message M1 is received, the impulse appears on pin 9. In case message M2 is decoded, the impulse exits from pin 11.

Figure 5:
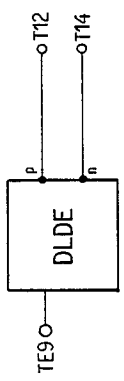

Operation Module ATSO IIIa (FIGS. 4, 5 and 6)

Module IIIa (FIG. 6) comprises the integrated circuit IC4 which, in the preferred embodiment, includes a COP 313L of the National Semiconductor Company and comprises a range of circuits that connects pins of IC4 with terminals of the module.

Pin 2 is connected to the +5 volt line from P5, and to ground through a capacitor C24 (100 kpF) to protect IC4 and to an electrolytic capacitor C25 (680 mF) that acts as a filter in the supply of power to modules in sections II and III.

Pin 16 is connected to resistors R28 (1M) and R29 (4.7k) and the ceramic resonator RI1, 455 kHz (U 455 of the Japanese Murata Company) to complete the oscillator circuit (clock) of IC4. Pin 15 is connected to ground. Pin 4 is connected (see FIG. 4) to the output terminal TED of the input module IIIb for detecting the continuous alarm signal, while pin 3 is connected to the output terminal TEC of module IIIb for detecting the three cycle alarm signal. The alarm can comprise a three cycle alarm signal. The first three signals can set off a normal alarm cycle, such as during connection of the ATS, while a fourth signal and any successive ones are not allowed to set off an alarm cycle. Pin 9 outputs switch signals to drive circuit LECI (LEd CIrcuit) used to intermittently switch, by way of connection through the terminal TEM, the LED located in the module US. The LECI circuit (see FIG. 6) includes the resistor R30 (15k) and the diode D7 (1N4148) connected to junction P6 in the ARCI circuit. The junction P6 is connected to pin 14. LECI further includes transistor T8 (BC182B), the emitter of which is connected to ground through a diode D8 (1N4004) while the collector is connected to terminal TEM which, via a diode D9 (1N4004) and a capacitor C26 (100 kpF), is connected to a circuit DSCI and a terminal TE8. The latter terminal is connected to sensors.

Pins 6 and 5 of IC4 are respectively connected to pins 9 and 11 of IC3. These pins 5 and 6 carry pulses corresponding to the control signals generated in response to the actuation, respectively, of keys TA1 and TA2 (see FIG. 2) of remote control I.

Pin 20 of IC4 (see FIG. 6) outputs to a circuit DUCI used to control the device that locks or unlocks the doors (see also FIG. 4). The DUCI circuit comprises (FIG. 6), beginning from pin 20, the resistors R31 (33k) and R32 (100k), and the transistor T9 (BCX38), the emitter of which is connected to ground and the collector of which is connected to one end of the coil B1. Coil B1 is protected by a capacitor C27 (100 kpF) and by a diode D10 (1N4004). Coil B1 controls, when excited, the switch SW5 to move it from a normal, inactive or rest position indicated in the diagram of FIG. 6 to the activated position. Hence, DLDE (FIG. 5) is supplied at the appropriate connecting terminal with the positive battery voltage of +12 volts through the terminals TE 12 and TE 16. The latter terminal is permanently connected to the positive terminal of the vehicle battery.

In FIG. 6, switch SW 6, which is controlled by relay coil B2, is in its rest position. Terminals TE 13 and TE 15 are permanently connected to the battery ground. The terminals TE 12 and TE 14 are connected to ground through the voltage limiters GM2 and GM3, which are varistors such as GE-MOV by the General Electric Company.

Pin 1 outputs a signal to a DLCI circuit used to control the lock of the DLDE and comprises resistors R33 (33k) and R34 (100k), as well as the transistor T10 (BCX38), the emitter of which is connected to ground while the collector is connected to one end of the relay coil B2. B2 is protected by a capacitor C28 (100 kpF) and by the diode D11 (1N4004). Coil B2 controls, when excited, the switch SW6 and moves it from the inactivated or rest position indicated in FIG. 6 to the other position. This provides DLDE at its connecting terminal with the +12 volts from terminal TE 16, while a return ground connection is provided from TE13 to TE12 through SW5 when the latter is in its rest position.

Pin 13 outputs to an ALCI circuit to control flashing of direction indicators. Circuit ALCI includes the resistor R35 (33k) and the transistor T11 (BCX38), the emitter of which is connected to ground while the collector is connected with an end of the relay coil B3. B3 is protected by capacitor C29 (100 kpF) and by diode D12 (1N4004), and controls, when excited, the switch SW 7. SW 7, when closed, supplies +12 volts from junction P1 through terminals TE2 and TE3, to the direction indicators.

Pin 11 of IC4 in FIG. 6 is connectable to a circuit ADCI that controls an alarm siren through a bridge E1 and a diode D13 (1N4148). Pin 12 is permanently connected to circuit ADCI through the diode D14 (1N4148). The circuit comprises, beginning from the diodes D13 and D14, the resistor R36 (22k) and the transistor T12 (BCX38), the emitter of which is connected to ground and the collector of which is connected to the negative end of the relay coil B4. B4 is protected by capacitor C30 (100 kpF) and by diode D15 (1N4004). B4, when excited, closes switch SW8 so as to supply through the terminals TE10 and TE11 the alarm siren signal SI. The latter terminals are connected to each other by a voltage limiter GM4 (GE-MOV II of General Electric). TE10 is connected by a pull-down resistor R37 (10k) to ground.

When the ATS is to be also prepared for antirobbery protection, pin 11 is further connected through a bridge E2 to a circuit ELCI which causes a locking of the engine and an opening of the supply circuits EOCI. ELCI comprises, beginning from E2, the resistor R38 (33k) and the transistor T13 (CBX38), the emitter of which is connected to ground while the collector is connected to the negative end of a relay coil B5 which is protected by a capacitor C31 (100 kpF) and by a diode D16 (1N4004). Coil B5 controls, when excited, switch SW9 which, by opening, locks the engine.

Pin 18 of IC4 in FIG. 6 is connected to a circuit LCCI which checks the locked or unlocked position of DLDE for locked or unlocked positions of the door locks. The circuit begins from terminal TE9 which is connected to the output of the DLDE (see FIG. 5) so that, when the DLDE is in a locked state, i.e., the door locks are locked, TE9 is low, while if the DLDE is in an unlocked position, i.e., the locks are unlocked, TE9 is high. Terminal TE9 is coupled to a diode D17 (1N4004), a resistor R39 (222k), a filter formed of a diode D18 (1N4004) and a capacitor C32 (4.7 mF), and a resistor R40 (10k). Resistor R40 connects with the +5 volt supply at junction P5. Inverter Schmitt trigger IN7 is part of the integrated circuit IC5 which is composed of a Hex Inverting Schmitt Trigger MM74C14N made by the National Semiconductor Company. This has six units, five of which (IN7, IN8, IN9, IN10, IN11) are used in the module ATSO (FIG. 6) while the sixth, IN12, is used in input module IIIb.

Pin 7 of IC4 in FIG. 6 is connectable to ground, to pin 14 or to a bridge E3. The positions of the bridge correspond to the selection of an alarm lasting 60, 30 or 180 seconds.

Pin 14 is connected to a circuit ARCI for the antirobbery device and begins at terminal TE4.

Circuit ARCI comprises a resistor R41 (100k), the junction P8 which is connected to +5 volt junction P5 through a diode D19 (14004) a resistor R42, (10k) IN8, a junction P6 and a diode D20 (14148).

A circuit PDCI is connected to circuit ARCI to check the state of the driver's door, i.e., whether it is open or closed. Circuit PDCI begins at terminal TE6. The voltage level of TE6 depends upon the position of the driver's door and in this embodiment is high when the door is closed and low when the door is open.

Circuit PDCI includes resistor R43 (3.3k), diode D21 (1N4004), the memory network comprising the capacitor (10 mF) and the resistor R44 (820k), the inverter IN9 preceded by the protection diode D22 (1N4004), and the resistor R45 (10k) connected to the base of the transistor T14 (BC182B). The emitter of T14 is connected to ground while its collector is connected through a capacitor C34 (10 mF) to junction P8 of circuit ARCI as well as directly to junction P9 of a reset circuit coupled to pin 17.

Pin 8 outputs a signal to circuit DSCI to arm or disarm the ATS and thus control power to sensors SS through terminal TE8 and to module US through terminal TEM.

Circuit DSCI includes two series connected inverters IN10 and IN11 which amplify the positive signal level at pin 8. Circuit DSCI includes junction P10 which is connectable to the engine lock circuit through bridge E2 if the ATS is configured to operate without the antirobbery cycle. Resistor R46 (4.7k) and transistor T15 (TIP 121) are also part of the DSCI circuit. The emitter of T15 is connected to ground and its collector is connected to terminal TE8 through thermistor TR1 (Ceramic P.T.C. Thermistor C955 of Siemens), and to a one watt, one ohm resistor R47. This collector is also coupled to terminal TEM through D9 and past C26.

The reset pin 17 is connected to junction P5 via diode D23 (1N4148) and resistor R48 (47k), and to ground by means of capacitor C35 (220 kpF). Pin 17 is further coupled to a reset circuit RECI through the collector of transistor T16 (BC182B), the emitter of which is connected to pin 8 while the base is connected to junction P9 downstream of terminal TE4.

Circuit RECI comprises diode D4, junction P7, pull-down resistor R101 (3.3k), resistor R49 (3.3k), junction P9, diode D24 (1N4004), resistor R50 (100k), junction P10, discharge diode D25 (1N4004), electrolytic capacitor C36 (10 mF), resistors R51 and R52 (both 47k), and transistor T16.

Pin 19 is connected to junction P2 through the sabotage circuit SACI. This includes resistor R53 (10K), electrolytic capacitor C37 (1 mF), diode D26 (1N4004), resistor R54 (100k) and R55 (47k), and transistor T17 (BC182B). The base T17 is connected to R54 while its emitter is connected to ground and its collector is connected to junction P5 through resistor R56 (10k) and to capacitor C38 (10 kpF) as well as pin 19.

Figure 7:
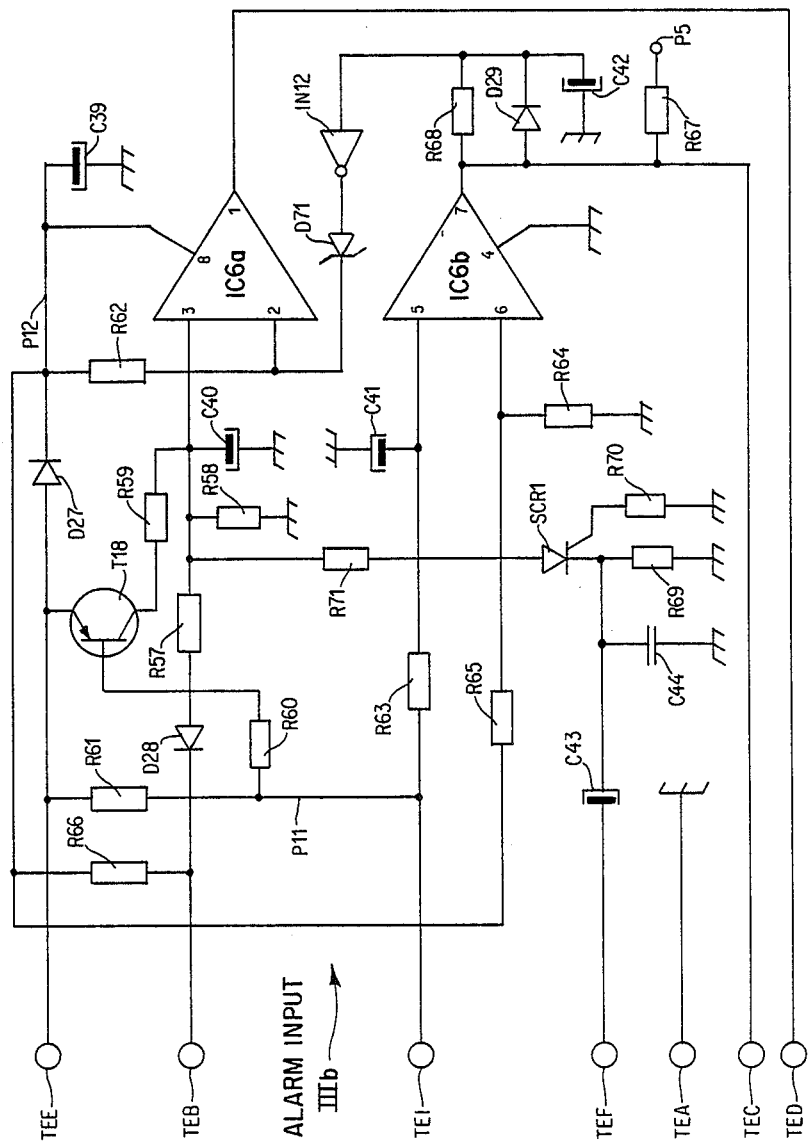

Alarm Input Module IIIb (FIG. 7)

The alarm input module IIIb comprises the integrated circuit IC6, which is a voltage comparator such as the National Semiconductor Company model LM393 having two independent units IC6a and IC6b with a total of 8 pins. Pin 8 of IC6a is connected to ground through electrolytic protection capacitor C39 (47 mF) and is supplied with +10.6 volts through the diode D27 (1N4004). Terminal TEE is at +11.2 volts as obtained from junction P3 of the power supply circuit SUCI (see FIG. 6). Pin 4 is connected to ground.

Pin 3 is coupled to ground by capacitor C40 (10 mF) and is connected through resistor R57 (8.2k), resistor R58 (22k) and diode D28 (1N4004) to terminal TEB. This terminal is coupled to sensors SS and, through resistor R59 (10k), to the collector of PNP transistor T18 (BC212B), the emitter of which is connected to terminal TEE. The base of T18 is connected through resistor R60 (8.2k) to a junction P11 that is, in turn, connected to terminal TEE through two watt resistor R61 (100k) and directly connected to supply terminal TEI. This latter terminal normally is at +10 volts depending upon the value of R61 of module US IIIc.

Pin 2 is connected through R62 (10k) to junction P12 and output pin 1 is connected to terminal TED and, through the latter to pin 4 of the continuous alarm circuit IC4 in FIG. 6.

Pin 5 of IC6b in FIG. 7 is connected through the resistor R63 (10k) to terminal TE1 and, via electrolytic capacitor C41 (4.7 mF), to ground. R61 connects pin 5 to terminal TEE. Pin 5 supplies a signal to module US IIIc.

Pin 6 is connected to ground through resistor R64 (100k); through resistor R65 (27k) to junction P12; and through R66 (3.3k) to terminal TEB.

Pin 4 is connected to ground. Output pin 7 is connected to terminal TEC and, through the latter, to the three cycle alarm pin 3 of IC4 of module ATSO IIIa in FIG. 6. Output pin 7 is further connected through resistor R67 (10k) to junction P5 and, through the parallel network made of resistor R68 (470k) and diode D29 (1N4148), the inverter IN12 and the 5 volt Zener diode DZ1, to pin 2 of IC6a. Capacitor C42 (10 mF) couples output pin 7 to ground downstream of R68 and D29.

Input module IIIb in FIG. 7 further includes an SCR diode SCR1 (BRX46) the cathode of which is connected through electrolytic capacitor C43 (10 mF) to terminal TEF. TEF is connected to junction P1 (FIG. 6) and, through the parallel network of capacitor C44 (10 kpF) and resistor R69 (100k), to ground. The grid of SCR1 is connected to ground through resistor R70 (1k) while the anode of SCR1 is connected to pin 3 of IC6a through resistor R71 (220k). Terminal TEA is connected to ground.

Ultrasound Module US IIIc (FIG. 8)

This module is connected to input module IIIb through a cable with four conductors connected to terminals TEI, TEM, TEA and TEU. Terminal TEA is connected to ground. Terminal TEU enables connection of the receiving module IIa located inside the housing of module US to the input pin 7 of the integrated circuit IC3 of decoding module IIb in FIG. 4. Power supply for module US IIIc and receiving module IIa is obtained, therefore, from the circuit connected to terminal TEI, electrolytic capacitor to ground C45 (2.2 mF), voltage regulator LM2 such as the stabilizer LM 2931 made by the National Semiconductor Company, the electrolytic capacitor to ground C46 (100 mF) and the junction P13 that is at +5 V.

Module US comprises an ultrasound emitter TX and an ultrasound receiver RX. TX is actuated by an oscillator composed of a resonator RI2 (40 kHz) and inverters IN13, IN14, IN15, IN16. The latter are units of an integrated circuit IC7 composed of a Hex Inverting Schmitt Trigger MM74C14 made by the National Semiconductor Company. Power is supplied at +5 volts from junction P13 through IN14 with a return to ground through IN16. The output of receiver RX is coupled to ground by capacitor C48 (330 pF) and resistor R75 (120k).

A coupling capacitor C47 (1 kpF) connects RX to the base of amplifier transistor T19 (BC 239), the emitter of which is connected to ground and the collector of which is connected back to the base through resistor R76 (5.6M). The collector is also connected to junction P13 through resistor R77 (15k) and, through coupling capacitor C49 (1 kpF), to the base of an amplifying transistor T20. The emitter of T20 is connected to ground through resistor R78 (6.8k) and directly to the collector of a feedback transistor T21 (BC239C). The emitter of T21 is connected to ground.

The collector of T20 is connected to its base through resistor R79 (5.6M) and to 5 volt junction P13 through resistor R80 (15k). A levelling network connects to the collector of T20 and includes a coupling capacitor C50 (1 kpF), a diode D30 (AA117), a diode D31 (AA117), a resistor R81 (48k) and a capacitor C51 (22 kpF). Junction P14 is connected through capacitor C52 (22 kpF) to pin 3 of integrated circuit IC8 which is composed of an LN358 Low Dual Operational Amplifier made by the National Semiconductor Company and includes two units IC8a and IC8b. Pin 3 of IC8a is coupled to junction P13 through resistor R82 (220k) and to ground through resistor R83 (also 220k). Pin 8 of IC8a is connected to junction P13.

Output pin 1 and pin 2 are connected to each other with a feedback network comprising trimmer RV1 (0 to 1M), resistor R84 (10k) and a parallel coupled filter composed of capacitor C53 (1 kpF). Pin 2 is also coupled to ground through resistor R85 (10k) and electrolytic capacitor C54 (1 mF).

The output pin 1 of IC8a is connected to the base of transistor T22 (BD182B) through a capacitor C55 (1 mF). This base is moreover connected to ground by a diode D32 to discharge C55 and by a resistor R86 (47k). The emitter of T22 is connected to ground while its collector is connected to junction P13 through resistor R87 (220k). Resistor R88 (15k) couples the collector of T22 to an electrolytic capacitor C36 and to a resistor R89 (220k). Junction P15 is coupled by resistor R90 (100k) to junction P 16 that is connected to junction P13 through a diode D33 (1N4148) and through the inverter IN17 and resistor R91 (8.2k), to the base of transistor T23 (BC182B), the emitter of which is connected to ground and the collector of which is connected to terminal TEI through resistor R92 (100k) and to the anode of an LED. The cathode of the LED is connected through resistor R93 (2.2k) to terminal TEM and through a network back to junction P15. An electrolytic capacitor C57 (2.2 mF) and a resistor R94 (2.2M)

couple TEM to ground. Diodes D35 and D34 (1N4148) couple terminal TEM to junction P15.

The second unit IC8b of IC8 has an input pin 6 connected to junction P14 and a pin 5 coupled to ground through the parallel network formed by resistor R95 (22k) and capacitor C58 (100 kpF). Pin 5 receives +5 volts from junction P13 through resistor R96 (100k).

Pin 4 is connected to ground, and output pin 7 is connected through resistors R97 (820k) and R98 (47k) to the base of a transistor T21 (BC239C). The output pin 7 of IC8b is also coupled to ground through a network formed by diode D36 (1N4148), resistors R99 (3.3k) and R100 (3.3M), and the electrolytic capacitor C60 (2.2 mF). Pin 7 is coupled to junction P16 through an inverter IN18 and diode D37 (1N4148).

Operation of the ATS

The antitheft system ATS now described is able to carry out the following functions: normal alarm function after its arming in case of a theft attempt, antisabotaging alarm if the power supply connection to the main dashboard or to the ATS is reconnected after having been disconnected, and an antirobbing function resulting in a delayed alarm if the driver is compelled out of the motor vehicle with the engine running. An engine lock panic function is provided if a suspect person is hanging about the motor vehicle and/or the driver is out of but near the vehicle, and the driver wants to actuate an acoustic signal generating device and the warning lights in order to dissuade the suspect person. This latter function is carried out by the ATS whether it is armed or disarmed.

Preparation Of The ATS Before Its Installation And Its Connection

Before installation, the bridges E1, E2 and E3 have to be prepared.

E1 in order to select if the siren shall sound continuously or intermittently.

E2 in order to select if the antirobbing device has to be made operative or not.

E3 in order to select the duration of the alarm as 30 or 60 or 180 seconds.

Installation And Connection Of The Supply Of The ATS

After installation, the connection of the ATS to the SUCI supply circuit is made by closing the switch SW3 and simultaneously opening the switch SW4 controlled by the disconnection of the key K1 for connection of the supply of the ATS.

The integrated circuit IC4, which is the heart of the ATS, has been masked with such a program as to perform the following functions:

IC4, as soon as its power is turned on, actuates the resonator RI1 and, therefore, the oscillator system (clock). Hence, pin 17 goes high through R48 and consequently the state of pin 19 is checked. Pin 19 can be low only if sabotage is occurring, as in the case of a disconnection of the supply connections from the ATS system. This includes the supply connection of TE4 and that of circuits EOCI which, therefore, have to be reconnected in order to allow the engine to operate. Upon reconnection, C37 (see FIG. 6) charges in 3 or 4 tenths of a second, thus causing a positive impulse at the base of T17 (FIG. 6) which, therefore, brings its collector to ground and consequently also pin 19.

In case pin 19 is low, IC4 checks the state of the pin 7 in order to insert into the program the preestablished time of duration of the alarm cycles and inserts the part of the program which is common to the sabotage and the antirobbing alarm. Thus, pin 8 is brought high, pin 17 remains high, T16 does not conduct, even if in the meantime a positive signal reaches its base, and pins 11 and 12 are brought high so that the alarm starts. This can be continuous or intermittent depending upon the configuration of bridge E1. If continuous, the alarm is composed of a continuous sound for 30, 60 or 180 seconds depending upon the configuration of bridge E3. If intermittent, sounds are produced of 1.3 second durations separated by intervals of 1.1 seconds.

The cycles of 30, 60 or 180 seconds continue to be repeated with pauses of 4 seconds between cycles whether the cycles are continuous or intermittent. If the ATS bridge E2 has been configured for the antirobbing function, pin 11 goes high to actuate the ELCI circuit and lock out the engine by opening SW9.

When sabotage is in progress, the pins 11 and 12 are immediately brought high, and in case of an antirobbing function, they are brought high after 33 seconds to allow the robber to go away from the driver. At the end of such delay, the siren starts and the engine locks.

If pin 19 is high when T17 is not conducting and C37 is not being charged, IC4 checks the state of pin 7 to determine the duration of the alarm. IC4 then cyclically checks the state of pins 5 and 6.

Control of ATS through Key TA1 (FIG. 2)

When a user presses key TA1, remote control I transmits the message M1 continuously for 3 seconds even if the key remains depressed. The buzzer BP continues sounding all the time TA1 remains depressed independently from the duration of the message.

The message picked up by the radioreceiving section IIa (FIG. 2) installed on the motor vehicle is detected by the latter and amplified at a low frequency for transmission to the decoding section IIb (FIG. 4). If the coding corresponds to message M1, the integrated circuit IC3 sends a positive impulse of 1.5 seconds from its pin 9 to pin 6 of IC4. This responds with its program to perform the following operations:

checks if there is an unlocked condition, i.e., whether pin 17 is high and, therefore, if IC4 is waiting for a control signal, if so, the program checks the state of pin 8. If the ATS is armed, pin 8 is high or, if the ATS is disarmed, pin 8 is low.

ATS disarmed.

If pin 8 is low and ATS is disarmed, the microprocessor in IC4 checks the state of pin 14, if pin 14 is high and the ignition key has not been inserted so that the engine is not running, the program uses pin 8 to go high and through circuit DSCI (see FIGS. 4 and 6) brings terminals TE8 and TEM low. This brings the sensors and module US in operative condition and causes an arming of the ATS. If the ATS has not been configured with the antirobbing cycle through the bridge E2, the high signal level at junction P10 of the DSCI circuit (see FIGS. 4 and 6) controls through T13 the opening of SW9 which causes the interdiction or inhibiting of all electric circuits EOCI essential for the operation of the engine. The latter thus remains locked out. Note that a high level at pin 8 does not control the engine lock if the ATS has been configured for an antirobbing cycle by way of bridge E2.

IC4 sends to pin 13 two positive impulses of 0.4 seconds each separated by an interval of 0.65 seconds. These are passed through circuit ALCI of the direction indicators to cause them to flash twice. These warning lights inform the user that the ATS has been connected.

A check is made of the state of pin 18 which, through circuit LCCI, that checks the state of DLDE, is connected to terminal TE9. If the locks are locked TE9 is low and consequently pin 18 is high, and vice versa. If the locks check to be locked, no further operations are performed.

If the locks are unlocked, IC5 sends a positive impulse to pin 1 which causes actuation of SW6 to operate the locks;

after five seconds, the state of pin 18 is checked again in order to confirm that the locks have been locked and that pin 18 has gone high;

if pin 18 is found low, i.e., the locks have not been locked, a positive impulse of one second is sent to pin 12 for a one-second actuation of the alarm siren SI to inform the user that the locks remain unlocked.

ATS Armed

If pin 8 is high and the ATS is armed, the effect of TA1 is changed by IC4 to a control that disarms the ATS. The program therefore operates as follows:

pin 8 is brought low to thereby remove the power to the sensors and to the US module. This is done by disconnecting the ground signal level to terminals TE8 and TEM.

only one positive impulse of 0.4 seconds is sent to pin 13 and, therefore, by way of the ALCI circuit, the direction indicators are actuated for one flash of 0.4 seconds to indicate that the ATS has been disarmed;

the state of pin 18 is checked in order to determine whether locks are locked or not;

in case pin 18 is low and, therefore, TE9 high, the locks are already unlocked and the ATS disarming program is terminated with this checking operation;

if pin 18 is high and, therefore, TE9 low, i.e., the doors are locked, a positive impulse is sent to pin 20 to actuate switch SW5 and unlock the locks.

Operation Of The ATS After Its Arming

After its arming, the ATS becomes operative only after a 44 second-long inhibiting delay. After this time, an alarm signal can reach pin 4 for a continuous alarm to terminal TED of the input section IIIb (FIG. 4), such as produced by one or more sensors SS. Hence, pins 11 and 12 are immediately made high. Pin 11 is provided with a continuous positive impulse for a time of 30, 60 or 180 seconds, depending upon the configuration of bridge E3. Pin 12 is provided, for the same duration, with intermittent impulses of 1.3 seconds at 1.1 second intervals. This causes a corresponding continuous or intermittent closure of switch SW8 (see FIG. 6) depending upon the configuration of bridge E1 and, hence, a continuous or intermittent acoustical signal is produced.

If the ATS has been configured by way of E2 to perform the antirobbing function, signals on pin 11 act through engine lock circuit ELCI to open SW9. This causes an immediate interruption of the circuit EOCI to lock the engine. If the antirobbing function has not been activated, engine lock is obtained by way of SW9 upon arming of the ATS through pin 8.

In such case, IC4 sends pin 13 intermittent positive pulses of 0.5 second duration separated by 0.6 second intervals for the duration of the alarm. This actuates the direction indicators with flashes at intervals equal to those of the latter pulses.

Following a continuous alarm, intermittent pulses of 0.3 seconds separated by intervals of 4 seconds are sent to pin 4 causing a corresponding intermittent supply of power to the LED. This, however, starts flashing only after the ATS has been disarmed, and stops flashing only when key K1 is inserted into the main dashboard. The LED thus characterizes the alarm and its type. The LED is on continuously during the arming of the ATS since power is then supplied to the LED without interruption.

If the alarm comes from terminal TEC for an alarm signal from module US, the alarm signal is delivered to the 3-cycle alarm pin 3. In such case, a similar operation program of IC4 takes place, except that the cycle of the alarm and of the alarm pulses to pins 11 and 12 for the acoustical alarm and to pin 13 for the warning light of the direction indicators is repeated at the most three times until a disarming of the ATS.

In the latter situation, the intermittent signal is sent out from the memory of IC4 and brings pin 9 high for two 0.3 second pulses separated by an interval of 0.3 seconds. This is repeated after a pause of 4 seconds and, therefore, the flashing of the LED occurs correspondingly.

Antirobbing Cycle Operation

TA1 (FIG. 2) controls the antirobbing cycle with a positive pulse of 1.5 seconds to pin 6 of IC4.

Two conditions are required to start the antirobbing alarm cycle program:

the engine must be running;
the driver's door must be open.

If the engine is running and the driver's door is not open, then when key K1 is inserted into the main dashboard, a +12 volt potential appears at terminal TE4 and the portion of circuit RECI of FIG. 6 consisting of D4, R49, P9, R50, P10, C36, R51 and R52 causes T16 to conduct, bringing its collector and thus also pin 17 low. Since its emitter goes to ground, pin 8 is kept low and the ATS is not armed and, therefore, IC4 is locked.

If the engine is running and the driver's door is open, TE6 is low and, therefore, through circuit PDCI, causes T14 to conduct and brings P9 to ground to inhibit conduction of T16. This, in turn, discharges C36 through D25 and brings pin 17 high to unlock IC4.

Pin 17 remains high also during the first 10 seconds following closure of the car door as the voltage stored in the memory network formed by R44 and C33 keeps T14 in conduction for this time.

In addition, when the key K1 is inserted, the voltage at TE4 acting through the portion of the RECI circuit formed by D4, R41, P8, R42, IN8, P6, D20 keeps pin 14 low. Since terminal P6 is low, the base of T8 is low, so that the control signals from pin 9 if pin 17 is also low are not allowed to switch the LED on through TEM.

If pin 17 is high and pin 14 is low, a pulse arriving on pin 6 of IC4 causes pin 8 to go high. After 33 seconds, continuous alarm pulses are sent to pin 11 and intermittent alarm pulses to pin 12 and to pin 13. The intermittent pulses provide an alarm flashing of the direction indicators. After the 33 second delay, the signal on pin 11 acts through bridge E2 to open switch SW9 and lock the engine, and depending upon the configuration of E1, a continuous or intermittent acoustical alarm signal starts.

The antirobbing and the antisabotaging cycles can be interrupted only by opening and subsequently closing SW3 of the SUCI circuit, and not through the remote control section I.

Operation Of The Panic Control With TA2

By pressing TA2, SW2 (FIG. 2) closes and from the encoding section sequences of message M2 are generated at pin 9 of IC1. Message M2 differs from message M1 only in the eleventh bit. The message transmitted by section Ia of the remote control I is picked up by the radio-receiving section IIa installed on the motor vehicle which detects received messages and transmits these after appropriate amplification at a low frequency to the decoding section IIb. This detects the presence of a message M2 and then generates a positive pulse of 1.5 seconds at pin 11. This pulse is received at pin 5 of IC4, which responds by immediately setting its pins 11, 12 and 13 high and keeps them so for 10 seconds. After this time, these pins go low again even if TA2 is still activated and so remain for at least 4 seconds. If, after this latter interval, key TA2 is still depressed or is pressed again, the panic control causes a new 10 second alarm and so on.

If pin 8 is already high and the ATS is already armed, the arrival of a pulse at pin 5 keeps pin 8 high. If, on the contrary, pin 8 is low, such as when the ATS is not armed, pin 8 is brought high for 10 seconds plus the aforementioned 4 second delay and during this time the ATS remains armed. After the 14 seconds, pin 8 is brought low again and the ATS is automatically disarmed.

If key TA2 is kept depressed or is re-depressed within the 10 second panic alarm period, the panic alarm sounds only for the initial 10 seconds.

When pins 11, 12 and 13 are high, the siren is continuously or intermittently actuated, depending upon the arrangement of bridge E1. The siren may operate for 10 seconds or may sound for periods of 1.3 seconds separated by pauses of 1.1 seconds. The direction indicators flash at a rate of 0.5 seconds separated by intervals of 0.6 seconds.

During a panic alarm, if the ATS is configured with an antirobbing function, pin 11 goes high to lock the engine by opening SW9 via circuit ELCI.

Operation Of The Alarm Input Module (IIIb)

After connection of power to the ATS with the closure of the switch SW3, the alarm input module is supplied through terminal TEE with +11.2 volts present at junction P3 of the circuit SUCI (FIG. 6). Pin 3 of IC6a is kept at +7 volts by transistor T18 which conducts when junction P11 is at +10 volts. Pin 2 is at +5 volts as a result of the value of R62 so that output pin 1 and terminal TED are kept high. Pin 5 of IC6b is kept at the voltage of P11, namely, +10 volts, and its pin 6 at +8.5 volts by way of a voltage divider formed by R65 and R64. Output pin 7 and terminal TEC are, therefore, high.

When a negative or low value arrives at terminal TEB as an alarm signal from one of the sensors, the voltage at pin 3 of IC6a decreases to a level lower than that at pin 2. Therefore, output pin 1 and terminal TED go low, and also pin 4 of IC4. This causes a continuous alarm and initiates the relevant alarm cycle.

When the driver's door is opened and as a consequence the courtesy light goes on, the voltage at terminal TEF decreases and the cathode of SCR1 goes lower than its grid which is already low. As a result, its anode goes low so as to cause the level of pin 3 to descend below that at pin 2. This causes a negative or low level at the output from pin 1 and at terminal TED and thus pin 4 of IC4 in FIG. 6 initiates a continuous alarm cycle.

The input module IIIb signals the occurrence of attempts to sabotage the US module. Such sabotage may include a cutting of the electrical power or a short-circuiting of the same, or an obstruction of the emitting and/or receiving surfaces of the US module.

Thus, if the power from terminal TEI is cut off, junction P11 goes to +11.2 volts as no current passes through R61. Therefore, T18 is prevented from conducting, and as a consequence, pin 3 of IC6a goes low and pin 1 outputs a negative pulse which arrives at pin 4 of IC4 serving to generate continuous alarm.

If TEI is short-circuited to ground, the level at pin 5 descends below that at pin 6 of IC6b. Pin 7 therefore outputs a negative pulse which arrives at pin 3 of IC4 for activating a three cycle alarm.

If one or both heads of the US module are masked or muffled, terminal TEI remains low even after the end of an alarm. As a consequence, pin 5 of IC6b remains low and so does pin 7, the voltage on which was discharged through C42 to a value lower than +2.5 volts. The inverter IN12 brings a high voltage to the anode of DZ1 causing its cathode to rise to at least +10 volts. This raises pin 2 to a level higher than pin 3 and results in a negative pulse from pin 1 and terminal TED to start a continuous alarm cycle.

Operation Of The Module US IIIc (FIG. 8)

This module is supplied electrical power at +5 volts by junction P13 downstream of LM2.

The oscillator for resonator RI2 actuates ultrasonic emitter TX. Receiver RX detects ultrasonic acoustic reflections. The receiver senses frequency changes occurring when persons move within the range of TX and this includes those inside the motor vehicle. The module in the example is located near the rearview mirror.

The frequency changes are first amplified by transistor T19 and also in a second amplifier stage provided by transistor T20. The amplified oscillations are transmitted through the collector of T20 to the levelling network (C50, D30, D31, C51, R81) which produces a positive pulse to junction P14 and thence to pin 3 of amplifier IC8a. Pin 2 of IC8a is kept low through the feedback network. The signal level at junction P14 is compared with that at pin 5 of IC8b. Since this is held at least at a level of +1 volts through R96, every time the signal level at junction P14 decreases near +1 volts, a positive pulse starts from output pin 7 of the comparator. This pulse is fed back to cause an increase in the conduction of transistor T21, thus increasing the signal at junction P14. The increase is regulated so as to occur slowly by use of the time constant formed by R97, R98, C59.

The voltage peaks amplified by IC8a bring T22 into conduction. The latter's collector goes low to cause a high at the output of inverter IN 17 and the base of T23. T23 thus goes into conduction and brings terminal TEI low. This sends a low or negative level through TEC to the three cycle alarm pin 3 of IC4 and initiates an alarm.

When one or both heads of the module are masked, muffled or otherwise blinded, receiver RX no longer receives ultrasonic reflections and, therefore, junction P14 in FIG. 8 remains at zero. The output pin 7 of comparator IC8b thus remains positive. The masking network formed by D36, R99, R100, C60, IN18 and D37 keeps junction P16 low and, through IN17 and R91, keeps T23 in conduction. The collector of T23 keeps the three-cycle alarm terminal TEI low. When the blinding of the receiver module persists beyond the duration of the alarm, a continuous alarm is also initiated.

When the US module detects movements inside the motor vehicle at the time of an alarm, the collector of T23 brings the anode of the LED low and the latter is, therefore, extinguished.

Upon arming of the ATS, terminal TEI goes high while TEM goes low through D9 and T15. Therefore, the LED lights indicate that the ATS is armed. The LED goes out during an alarm of the US module and lights up again as soon as the alarm ceases.

As soon as alarms from the sensors (terminal TEB) as well as from the US module (terminal TEI) cease, the integrated circuit IC4 sends intermittent positive pulses to pin 9. These pulses bring T8 (see FIG. 6) into conduction, which in turn sends negative pulses at the same intervals to TEM. The LED would flash were it not constantly held lit as a result of T15 being kept low as long as the ATS is armed. After disarming of the ATS, the LED starts to flash if alarms have occurred. The microprocessor is so programmed that pulses from pin 9 continue to be sent to flash the LED as long as key K1 is not inserted.

The LED lights as soon as the ATS is armed and the driver can immediately check the operation of the US module although the ATS is inhibited during an initial 44 seconds.

An initial inhibiting feature is provided by the program inside the microprocessor MP. This operates so that even if signals are received at pins 3 and 4, the pulses to pins 11, 12 and 13 for the circuits ADCI and ALCI are initially inhibited. Hence, when a hand is moved in front of the US module, the LED goes out but no alarm starts.

Having thus described an embodiment in accordance with the invention, variations thereof can be made without departing from the scope of the invention.

What is claimed is:

1. Antitheft system for a vehicle provided with an engine, engine operating control means having a first state in which the engine is operable and a second state in which the engine is disabled, and a door movable between an open position and a closed position, the antitheft system having an armed condition and an unarmed condition and comprising:
   means for generating a control signal; and
   means on the vehicle responsive to said control signal, said responsive means being operable to sense the state of the engine control means, the position of the door and the condition of the antitheft system, and said responsive means further being operable to: (i) arm the antitheft system in response to said control signal when the antitheft system is unarmed, the door is closed and the engine control means is in the second state, (ii) disarm the antitheft system in response to said control signal when the antitheft system is armed, and (iii) produce an alarm condition in response to said control signal when the engine control means is in the first state, the door is open and the antitheft system is unarmed, the production of said alarm condition including converting the engine control means to the second state to disable the engine.

2. Antitheft system as claimed in claim 1 said responsive means including:
   delay means for delaying the production of said alarm condition a predetermined time after the control signal has been detected to enable said vehicle to distance itself from a remote location before the alarm condition arises.

3. Antitheft system as claimed in claim 1 wherein said responsive means is programmed to perform the following functions in response to an alarm event when the antitheft system is armed and the control means is in the first state:
   generate an alarm signal, and
   convert the engine control means to the second state.

4. Antitheft system as claimed in claim 1 wherein said control signal generating means comprises a portable remote control unit.

5. Antitheft system as claimed in claim 1 wherein said responsive means includes:
   means for sensing the state of the engine control means and whether an ignition key is inserted to operate the vehicle.

6. Antitheft system as claimed in claim 1 said responsive means including: means for producing an open door signal indication for a predetermined interval of time after the door is closed.

7. Antitheft system as claimed in claim 1 wherein the antitheft system is powered through a power supply circuit and further includes:
   means for sensing when said power supply circuit has been disconnected and subsequently reconnected; and
   means for generating a sabotage alarm condition in response to reconnection of said power supply circuit.

8. Antitheft system as claimed in claim 7 and further including:
   means for permitting termination of said sabotage alarm condition only upon disconnection of the power supply circuit following reconnection thereof and subsequent connection of the power supply circuit.

9. Antitheft system as claimed in claim 1 and further comprising:
   means for generating an alarm indication;
   means for varying the duration of an alarm indication; and
   means for selecting whether the alarm indication is to be continuous or intermittent.

10. Antitheft system as claimed in claim 1 and further including:
    means for ultrasonically detecting an alarm event inside the vehicle and producing an alarm indication thereof; and
    means for generating an indication that the protection system is armed.

11. Antitheft system as claimed in claim 10 wherein the ultrasonic alarm detecting means includes:
    means for enabling said alarm-indication producing means when an alarm event has occurred.

12. Antitheft system as claimed in claim 10 and further comprising:
    means for sensing when power to the ultrasonic detecting means is interrupted;
    means for sensing when an ultrasonic surface said ultrasonic detecting means is masked; and
    means for causing an alarm when either of said two sensing means is activated.

13. Antitheft system as claimed in claim 1 and further including:
    power supply means for said responsive means; and
    means for connecting said responsive means to said power supply means, said connecting means having a first position in which said responsive means is connected to said power supply means and a second position in which said responsive means is disconnected from said power supply means, and said connecting means being in said first position during said alarm condition, said responsive means including means for permitting termination of said alarm condition only upon movement of said connecting means to said second position and then back to said first position.

14. Antitheft system as claimed in claim 1 and further including:
means for selectively inhibiting production of said alarm condition.

15. Antitheft system as claimed in claim 1 wherein the control signal generating means comprises:
means for generating at least first and second separately decodable messages and wherein the responsive means includes:
means for decoding said messages and generating first and second pulses respectively representative thereof; and
means responsive to one of said pulses for producing an alarm of a duration indicative of a panic condition.

16. Antitheft system as claimed in claim 1 wherein said responsive means comprises means for generating an alarm signal, the production of said alarm condition including activation of said alarm signal generating means.

17. Antitheft system as claimed in claim 1 and further including:
power supply means connectible to and disconnectible from said responsive means, said responsive means being programmed to perform the following functions upon connection to said power supply means:
check for sabotage,
monitor for the arrival of said control signal in the absence of sabotage, and
determine the condition of the antitheft system upon arrival of said control signal.

18. Antitheft system as claimed in claim 17 and further including:
means for locking the door, the locking means having an operative condition in which the door is locked and an inoperative condition in which the door is unlocked, and said responsive means being programmed to perform the following functions in response to said control signal when the antitheft system is unarmed:
determine the position of the door and the condition of the engine control means,
arm the antitheft system when the door is closed and the engine control means is in the second state,
generate a signal indicating that the antitheft system is armed,
check the condition of the locking means,
operate the locking means if in the inoperative condition to convert the same to the operative condition,
recheck the condition of the locking means, and
generate a signal indicating that the door is unlocked if the locking means remains in the inoperative condition.

19. Antitheft system as claimed in claim 17 and further including:
means for locking the door, the locking means having an operative condition in which the door is locked and an inoperative condition in which the door is unlocked, and said responsive means being programmed to perform the following functions in response to said control signal when the antitheft system is armed:
disarm the antitheft system,
generate a signal indicating that the antitheft system is unarmed,
check the condition of the locking means, and
convert the locking means to the inoperative condition when the latter is in the operative condition.

20. Antitheft system as claimed in claim 17 wherein said responsive means is programmed to perform the following functions in response to said control signal when the antitheft system is unarmed:
determine the position of the door and the condition of the engine control means,
arm the antitheft system when the door is open and the control means is in the first state,
generate an alarm signal after a predetermined delay following arming of the antitheft system, and
convert the engine control means to the second state after said predetermined delay.

21. Antitheft system for a motor vehicle having an engine and an engine operating control circuit comprising:
means for generating a control signal to activate an antirobbing function;
means in the vehicle for sensing at least first and second vehicle operation conditions, one of said conditions being associated with a vehicle segment on the driver's side of the vehicle, and a second condition being associated with the operational status of the engine operating control circuit;
means in the vehicle for detecting said control signal and in response thereto producing an alarm condition when a predetermined state of said at least first and second vehicle operating conditions has occurred;
means for ultrasonically sensing an alarm condition inside the vehicle and producing an alarm indication thereof;
means for enabling the antitheft system and generating an indication that the antitheft system is armed; and
a housing mounted on the upper part of the front windshield of the vehicle, said housing including said means for ultrasonically sensing and said means for detecting said control signal.

* * * * *